United States Patent [19]

Roche

[11] 4,008,910
[45] Feb. 22, 1977

[54] UNIVERSAL ELECTRICAL SWIVEL

[76] Inventor: Thomas F. Roche, 21 W. Main St., Merrimac, Mass. 01860

[22] Filed: May 16, 1975

[21] Appl. No.: 578,207

[52] U.S. Cl. .................... 285/164; 174/86; 285/282; 285/404; 285/423; 285/DIG. 8

[51] Int. Cl.[2] ....................... H02G 13/00

[58] Field of Search ........... 285/DIG. 8, 185, 164, 285/282, 423, 404; 403/113, 112, 116, 117; 174/86; 339/2 R, 2 A, 2 L, 1 R, 1 L

[56] References Cited

UNITED STATES PATENTS

| 844,740 | 2/1907 | Patterson | 285/185 X |
|---|---|---|---|
| 1,123,839 | 1/1915 | Bridges | 285/185 X |
| 1,765,693 | 6/1930 | Muend | 285/185 X |
| 2,613,313 | 10/1952 | Weeks | 339/2 A X |
| 2,632,660 | 3/1953 | Krauthamer | 285/164 X |
| 2,825,586 | 3/1958 | Robboy | 285/DIG. 8 |
| 3,034,809 | 5/1962 | Greenberg | 285/282 X |
| 3,091,484 | 5/1963 | Laupot | 285/DIG. 8 |

FOREIGN PATENTS OR APPLICATIONS 1,088,497 9/1954 France ..................... 285/185

Primary Examiner—Thomas F. Callaghan
Attorney, Agent, or Firm—Weingarten, Maxham & Schurgin

[57] ABSTRACT

A high reliability universal electrical swivel fabricated of insulative material virtually impervious to moisture or corrosive acid or alkaline vapors and having substantial flexural elasticity provides a conduit for an electrical conductor rotatable and tiltable about orthogonal axes. The swivel is adapted to retain its fixed position notwithstanding severe vibration and shock. Novel design minimizes stress on the internal conductor and its insulation thus minimizing the possibility of internal short circuits. The swivel components are especially adapted for economical mass manufacture and assembly.

2 Claims, 3 Drawing Figures

U.S. Patent  Feb. 22, 1977  4,008,910
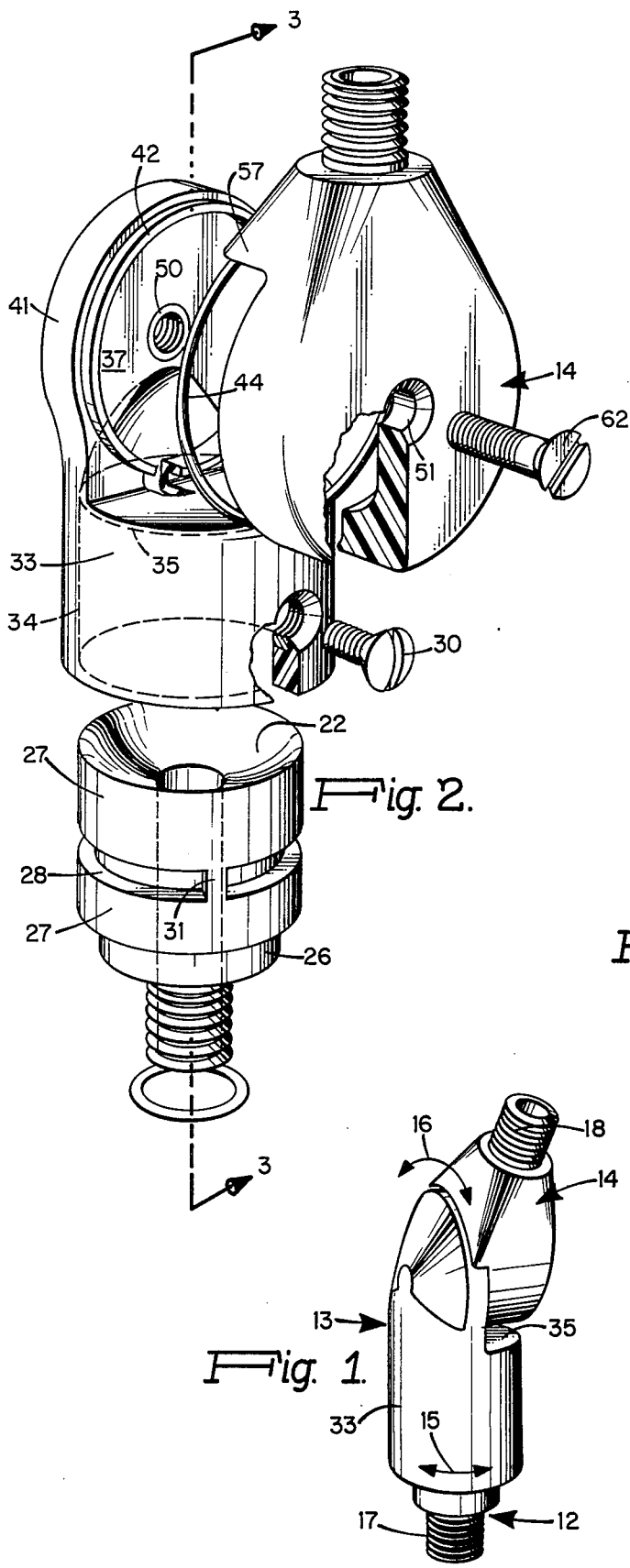
Fig. 2.
Fig. 1.
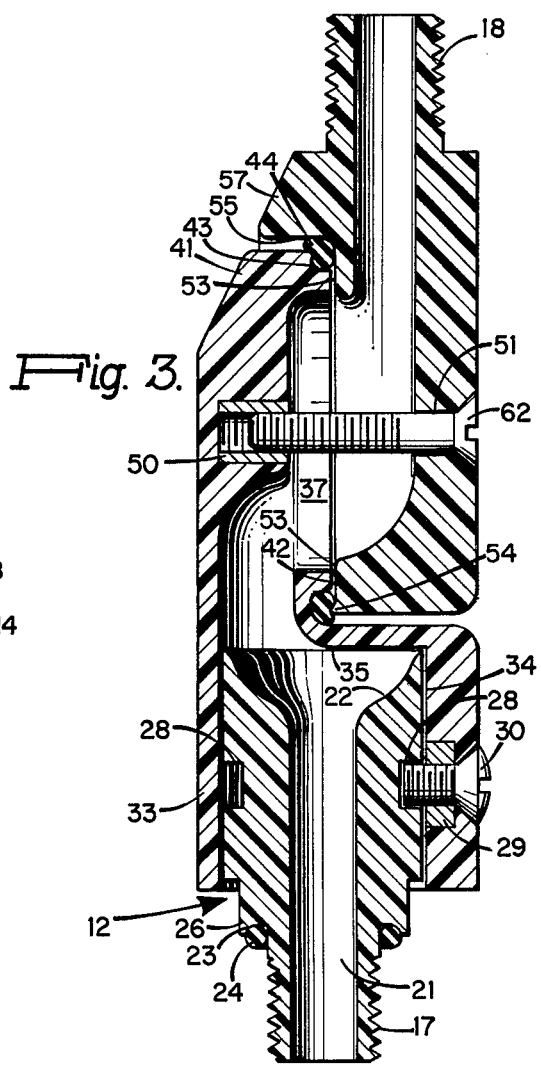
Fig. 3.

UNIVERSAL ELECTRICAL SWIVEL

FIELD OF THE INVENTION

The present invention relates in general to an electrically non-conductive, chemically inert and non-corrosive universal swivel joint, primarily adapted for use with electrical lighting fixtures adapted to operate under adverse environmental conditions, such as severe mechanical shock, vibration, chemical fumes and moisture, which may be economically manufactured with a minimum of readily assembled components.

BACKGROUND OF THE INVENTION

The universal swivel joint has achieved widespread acceptance in electrical apparatus, and most commonly, such swivels are utilized to permit the extensive angular adjustment of a light source supported on a suitable base. Assuming a fixed base, the swivel normally allows rotation of the light source slightly less than 360° about one axis, and about 180° about a perpendicular axis. Thus, the illumination may be directed in almost any desired manner.

Perhaps the most widely accepted electrical swivel consists of a white metal device comprised of four principal diecastings, two of which form an elongated hollow central body portion, while a base element and a tiltable upper element are clamped between the two body sections. The flexible insulated electrical wire passes upward through the base, between the two body sections and out through the tiltable upper component. While low cost has undoubtedly been a principal factor in the success of this swivel, numerous disadvantages are known; most significantly, their inability to survive effectively in corrosive atmospheres, their poor performance under shock and vibration and that continued tilt and turn may ultimately cause the insulation of the internal wire to fray within the case metal housing and cause an electrical short circuit. Further, operation which is less than smooth is to a large extent dependent upon the tightness of the assembly screws.

The patent literature is quite illustrative of prior swivel designs, and U.S. Pat. Nos. 2,587,917, 2,887,329 and 3,091,484 are illustrative of relevant advances in the art. There are, of course, numerous other patents in the related Patent Office class which show not only earlier designs but also efforts to enhance the utility and ease of manufacture of the product. These patents furnish useful background, and a study thereof is advantageous to an understanding of the features and advantages of the present invention.

SUMMARY OF THE INVENTION

The present invention concerns a universal electrical swivel joint which advantageously protects the electrical insulated conductor which passes therethrough while providing exceedingly high resistance to corrosion, shock, vibration, heat and electrical short circuits.

Broadly speaking, the novel swivel is comprised of three principal body components fabricated of a polycarbonate resin such as polyphenylene oxide which is particularly advantageous in imparting immunity to corrosion, excellent electrical insulation, high strength, and flexural elasticity. These body parts are economically molded to achieve a superior product at a competitive market price and when assembled permit smooth rotation and tilt while being virtually waterproof and highly resistant to the penetration of corrosive vapors and moisture.

One of the three body members serves as a stationary base for attachment to the external support structure. A second body member includes a section which encircles the base member to achieve a smoothly operating bearing for nearly 360° of rotation about one axis while the third body member permits attachment of an illumination fixture and coacts with the second body member to allow tilt of approximately 90° in each direction about a transverse axis. When assembled the three members define a relatively large, unencumbered, continuous smooth passage for a suitable electrical conductor while permitting rotation and tilt about orthogonal axes without adverse stress upon the wire or its insulation.

The novel arrangement utilizes gaskets to seal the interior of the device against water penetration and vapors while enhancing swivel action.

BRIEF DESCRIPTION OF THE DRAWINGS

With reference to the accompanying drawings:

FIG. 1 is a general perspective view of the assembled swivel connector of the present invention;

FIG. 2 is an exploded view of the swivel shown in FIG. 1 and illustrates in perspective (with some parts being broken away for clarity) the constructional details of the individual components prior to final assembly; and FIG. 3 is a cross-sectional view of the swivel taken generally along the plane 3—3 of FIG. 2, illustrating the manner in which the various components which comprise the swivel of FIGS. 1 and 2 are assembled for use.

DETAILED DESCRIPTION OF THE PREFERRED EMBODIMENT

With reference now to the drawing and more particularly to FIG. 1, the novel swivel of this invention is illustrated in its assembled form ready for installation. Generally, this swivel is seen to comprise three principal structural body members, namely, an upright stationary base 12, a central rotating body portion 13 and a tiltable upper body portion 14. It should be observed at this point that throughout the following detailed specification, the swivel of the present invention will be described as having a principal vertical orientation, as illustrated in the drawings, and that the principal axes of the device will be considered to be vertical and horizontal. Correspondingly, discussion of rotation and tilt will also relate to these respective areas and to the vertical physical configuration shown in the drawings. It will be understood, however, that the present swivel joint is not limited to any particular mounting direction, and as will become apparent, the device may be secured to a base which is set at any angle when in use. The repeated reference throughout this application to the vertical arrangement shown in the drawings is one of convenience of description and should not be deemed to be a limitation in any respect.

Broadly speaking, when in use the swivel shown in the accompanying drawing is mounted by secure attachment of the stationary base 12 to a suitable structure such as a lamp, a lamp housing, a battery container for emergency lighting or the like. The base 12, when fitted to a housing of this type, remains rigid and motionless, unless the housing itself is moved for some reason.

As indicated in FIG. 1, central body member 13 is arranged for rotation about a vertical axis, as generally indicated by the double arrow heads 15, and as will become apparent, rotation about the vertical axis is limited to an amount just short of 360°. Upper body member 14 is, as shown by the double arrow heads 16 in FIG. 1, tiltable about a transverse, horizontal axis and as will appear, the available angle of tilt is roughly 90° in either direction from the vertical for a total of 180°. In summary, with the base member 12 stationary, the central body member 13 can rotate nearly 360° about a vertical axis while the upper body member 14 can tilt approximately 90° in either direction from the vertical axis about the central body member 13, the latter being independent of the angular position of central body member 13.

For attachment of the swivel to a fixed structure (not shown), stationary base member 12 is provided with an integral threaded hollow cylindrical downward extension 17, while upper body member 14 is correspondingly formed with an upward threaded hollow extension 18 for attachment to a lamp housing, as is customary. The attachment nuts are conventional and are not shown. An insulated wire (not shown) is normally fed through a passage in the device from the lowermost opening of threaded extension 17 to the upper end of threaded extension 18 to connect an appropriate source of electrical power to the electrical lighting fixture attached to the upper end of the swivel. As is evident, such an insulated electrical conductor is subject to twist about its vertical axis whenever the central body member 13 is rotated about its vertical axis and to bending or flexing as the upper body member 14 is tilted in either direction about the horizontal axis. As will be noted below, it is a feature of the present invention that the fraying of the electrical insulation is avoided and that chemical or corrosive elements, if such are present in the atmosphere in which the swivel operates, virtually do not affect operation.

With the foregoing in view, it is appropriate to discuss the structural details of the three principal body members 12, 13 and 14 before turning to further discussion of the manner in which the device performs in service. More specifically, as shown in FIGS. 1, 2 and 3, the stationary base member is comprised of a generally hollow, cylindrical integral component which includes the previously mentioned hollow, cylindrical threaded extension 17. As best illustrated in FIG. 3, a central axial passage 21 extends completely through stationary base member 12, terminating at its upper end in a flared conical portion 22. On its outer surface immediately above the threaded extension 17, a small annular recess 23 is formed to retain a conventional resilient O-ring 24 which serves as a gasket seal when the threaded extension 17 is inserted and tightened down into a supporting base. As is best shown in FIGS. 2 and 3, the outer surface of stationary base member 12 continues upwardly beyond the O-ring recess 23, there being a cylindrical surface 26 followed by a larger diameter cylindrical bearing surface 27, virtually divided in two by an annular groove 28 of substantially rectangular cross-section. Annular recess 28 is less than full circle by virtue of a stop portion 31, which as will be discussed later, functions to limit the permissible degree of rotation of central body portion 13 about the vertical axis.

Central body member 13 is formed integrally as shown in the drawings of a hollow, vertical cylindrical portion 33 which includes an internal cylindrical bearing surface 34 formed to fit securely, and smoothly rotatable over the outer cylindrical bearing surface 27 of stationary base member 12. As is apparent from FIGS. 2 and 3, the axis of the internal cylinder is offset from the axis of the outer cylindrical surface to provide a thicker wall on the right hand side as viewed in FIG. 3. As viewed from the right-hand side of FIGS. 1, 2 and 3, the cylindrical portion 33 of the central body member 13 terminates at an inwardly extending horizontal surface 35 which clears the top of base member 12. A knurled threaded insert 29 is rigidly fitted into the wall 33 (which as seen in FIG. 3 is thicker on the right hand side thereof) and this in turn receives the set screw 30, which will be discussed later. From that point upward in body member 13, a tapered cavity 37 is formed by an integral circular sidewall extension 41. This extension, which is comparatively flat, is formed with a circular shoulder having a planar circular surface 42 (broken away in part in FIG. 2 for clarity) about which a recess 43 is formed to retain a resilient O-ring gasket 44.

As is best seen in the cross-sectional view of FIG. 3, cavity 37 is widest at its lower portion (namely the portion immediately above stationary base member 12) and narrows at its upper portion. More specifically, the planar shoulder 42 defines the outer surface of a generally dish-shaped recess which, as it extends downward, widens into a larger cavity as indicated in FIG. 3. Accordingly, central body member 13 is seen to comprise a lower cylindrical portion which forms a collar having an internal bearing rotatable about the base member 12, and an upper portion which is somewhat flat and generally circular, and which includes the dish-shaped cavity 37 around which the O-ring 44 is positioned for reasons which will become apparent below. Centrally disposed in the upper thickened wall section of the generally circular portion 41, a knurled threaded insert is fitted securely, and as will be noted in FIGS. 1 and 3, this insert does not extend through the outer surface of the wall of section 41.

Turning now to upper body member 14, this is comprised generally of a circular wall portion having a horizontal central countersunk opening 51, the integral upper threaded hollow extension 18 mentioned previously, and a generally flat circular flange 53 which corresponds in diameter and confronts cylindrical flat shoulder 42 on central body portion 13. The outer circular edge of surface 53 is defined between a small raised lip 54 and an arcuate shoulder 55 formed by upper projection 57. Lip 54 and shoulder 55 engage the O-ring 44. As is seen, the inwardly projecting integral portion of body member 14 is arranged, as shown in FIG. 3, to extend over the outer cylindrical surface of the upper portion 41 of body member 13. This arrangement is also illustrated in FIG. 1 which clearly shows the manner in which projection 57 rotates about circular wall 41 in the assembled swivel joint and the manner in which the ends of projection 57 effectively define stops limiting the tilt of upper member 14 about central body member 13.

Having described the principal structural features of the three body members, attention will now be directed to the cross-sectional assembled views of FIG. 1 and 3. As noted earlier, threaded insert 29 is rigidly anchored within the cylindrical wall of body member 13 and is arranged to receive set screw 30 having a flat inner face which fits precisely within annular recess 28. With screw 30 tightened securely, there is an adequate clearance permitting the free, smooth rotation of body member 13 about base member 12. Rotation, of course, is constrained to somewhat less than 360° by virtue of the limiting stop 31 shown in FIG. 2.

For assembly of upper body portion 14 on to central body portion 13, a screw 62 which is threaded only on its inner end is passed through countersunk opening 51 and fastened into insert 51, the rightness of the fit being sufficient to compress O-ring 44 in the manner shown in FIG. 3 while nevertheless permitting smooth angular rotation of upper body member 14 about the axis screw 62. The fact that the shank of screw 62 is smooth in the area where it passes through body member 14 precludes undesirable loosening of the screw during the rotation of the body member 14 about that axis. An electrical wire (not shown) may extend continuously upward through the swivel and as best illustrated in FIG. 3, will pass upwardly through stationary base member 13, through the tapered cavity 37 and then around one or the other side of screw 62 through the hollow portion of upper body member 14. The ease of which the body portion 13 may be rotated about the base 12 is determined by the frictional bearing fit between outer surface 27 and the inner hollow cylindrical surface 34. The relative ease of tilt of upper body portion 14 about body portion 13 about the horizontal axis is determined by the tightness of screw 62 (that is, the extent to which O-ring 44 is compressed). An appropriate durable grease may be applied to facilitate rotation.

It is a feature of this swivel that the three principal body members 12, 13 and 14 are preferably fabricated of a polycarbonate material such as polyphenylene oxide. This material enables economical precision, molding and accurate fit and is entirely resistant to the acid or alkali environments of the type that may be encountered when the novel swivel is used atop a storage battery container of the type used for emergency lighting or in an industrial machine or production environment in which acid or alkaline vapors are present much of the time. Polyphenylene oxide is electrically insulative and thus overcomes the severe dangers of shock or explosion, should one of the electrical conductors passing through the swivel accidentally become frayed, or otherwise lose its insulative quality due to decay. The chances of fraying of insulation, however, is exceedingly remote because of the generally smooth internal finish of the continuous vertical cavity through which the electrical wire in this novel switch passes. Polyphenylene oxide is a poor conductor of heat and thus the electrical insulation of the wire passing through the swivel is less subject to deterioration, should the working atmosphere be at elevated temperature. The polycarbonate material exhibits a high degree of flexural elasticity which allows the swivel to be used in areas such as machine shops and production areas where the device may be subject to continuous or intermittent shock and vibration. The ability to absorb shock and vibration not only greatly extends the useful life of the device, but also minimizes the transfer of such shock and vibration through to the electrical conductor which passes through the swivel.

A feature of the swivel of this invention is that the O-rings and gaskets have been arranged between the various components to make it virtually waterproof and resistant to the penetration of vapors. By the addition of a suitable O-ring at the lowermost adjacent areas of members 12 and 13 and a nut as required on surface 26, the swivel may be made submersible, if desired. Again, the advantage for severe industrial environments should be obvious.

With the structural features of the novel electrical swivel joint of this invention now in view, other applications and advantages should become apparent to the person skilled in the art. It will be appreciated that the invention is thus to be limited solely by the scope of the appended claims.

What is claimed is:

1. A universal swivel adapted to provide rotation and tilt of electrical apparatus about orthogonal axes and to serve as a conduit for an electrical conductor comprising:
    a base member having a generally smooth outer cylindrical bearing surface and an axial passage, adapted for passage of an electrical conductor, said base member being formed at its outer end with means for attachment to said electrical apparatus and at its inner end with generally conical depression communicating with said axial passage;
    a central body member formed with an integral cylindrical collar fitted over said cylindrical bearing surface for smooth rotation thereon and formed with a first generally circular dish-shaped portion extending outward from said cylindrical collar, said dish-shaped portion having a cylindrical outer edge surface, the inner end of said collar being substantially flat and sealed but formed with an opening adapted to permit passage of an electrical conductor from said conical depression of said base member through to the inner region of said first dish-shaped portion;
    an upper body member formed with a second generally circular dish-shaped portion mating with and adapted to smoothly rotate about said first dish-shaped portion of said central body member, said upper body member being formed with an integral portion having an inner cylindrical wall extending over and smoothly mating with said cylindrical outer edge of said first circular dish-shaped portion of said central body member to limit the angle of rotation of said upper body member about said central body member;
    said base member, central body member and said upper body member being formed of insulative, flexurally elastic polycarbonate substantially impervious to acid and alkali substances;
    the axis of said outer cylindrical bearing surface of said base member being offset from the axis of said cylindrical collar of said central body member, said collar having a region of increased thickness at one side thereof;
    said means for limiting rotation of said central body portion about said base member including an annular recess in said base member;
    a stop formed in said recess, and means projecting into said recess from said collar of said central body member, said last-mentioned means being securely affixed in said collar in said region of increased thickness;
    the inner surface of said first and second dish-shaped portions cooperating to form a circular hollow chamber; and
    means for retaining said circular portions of said central and upper body members in frictional engagement for rotation in a plane parallel to the axis of said base member and for sealing said hollow chamber against the passage of moisture therethrough;

said upper body member having an integral outward extension adapted for attachment to said electrical apparatus and having an axial hollow passage communicating with said circular hollow chamber;

whereby an electrical conductor may pass inward freely through said axial passage and said conical depression in said base member, through said opening in the flat upper end of said central body member and into said circular hollow chamber and outward through said axial passage in said integral hollow extension of said upper body member.

2. A universal swivel adapted to provide rotation and tilt of electrical apparatus about orthogonal axes and to serve as a conduit for an electrical conductor as in claim 1 wherein:

said means for sealing said region of engagement between said circular portions of said central and upper body members against the passage of moisture therethrough includes a circular shoulder encircling said dish-shaped portion of said central body member; and an O-ring disposed around said shoulder and compressed between said central body member and said circular portion of said upper body member.

* * * * *